(12) United States Patent
Hu et al.

(10) Patent No.: US 10,797,789 B2
(45) Date of Patent: Oct. 6, 2020

(54) DISTRIBUTED FIBER SENSING INTERROGATOR WITH DETACHABLE END

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/454,056

(22) Filed: Jun. 27, 2019

(65) Prior Publication Data

US 2020/0007228 A1    Jan. 2, 2020

Related U.S. Application Data

(60) Provisional application No. 62/691,151, filed on Jun. 28, 2018.

(51) Int. Cl.
*H04B 10/071* (2013.01)
*G01D 5/353* (2006.01)
*H04B 10/25* (2013.01)

(52) U.S. Cl.
CPC ........... *H04B 10/071* (2013.01); *H04B 10/25* (2013.01)

(58) Field of Classification Search
CPC .............................. H04B 10/071; G01D 5/353
See application file for complete search history.

(56) References Cited

U.S. PATENT DOCUMENTS

| | | | |
|---|---|---|---|
| 2002/0190945 A1 | 12/2002 | Moore | |
| 2009/0027659 A1* | 1/2009 | Vidovic | G01D 5/268 356/73.1 |
| 2015/0285683 A1* | 10/2015 | Ouellette | G01J 3/0218 356/451 |
| 2016/0161632 A1 | 6/2016 | Barfoot et al. | |
| 2019/0391348 A1* | 12/2019 | Osenbach | G02B 6/4267 |

* cited by examiner

*Primary Examiner* — Shi K Li
(74) *Attorney, Agent, or Firm* — Joseph Kolodka

(57) ABSTRACT

Aspects of the present disclosure describe systems, methods and structures for distributed fiber sensing systems including interrogator and attached fiber in which the interrogator includes a common line card and function-specific, pluggable front end in which the line card is configurable and supports different signal processing paths and automatically senses the front-end type and uses corresponding firmware/software or signal processing path(s) to process sensed data.

5 Claims, 7 Drawing Sheets

DISTRIBUTED FIBER SENSING INTERROGATOR WITH DETACHABLE END

CROSS REFERENCE TO RELATED APPLICATIONS

This application claims the benefit of U.S. Provisional Patent Application Ser. No. 62/691,151 filed 28 Jun. 2018 the entire contents of which is incorporated by reference as if set forth at length herein.

TECHNICAL FIELD

This disclosure relates generally to optical fiber sensing systems, methods, and structures. More particularly, it describes a distributed fiber sensing interrogator with detachable end.

BACKGROUND

As is known in the optical sensing arts, contemporary distributed fiber sensing system DxS (Distributed-x-Sensing, where x can be 'V' for Vibration, 'T' for Temperature, or 'A' for Acoustic) is primarily configured as a standalone system that includes an interrogator for optical signal generation and sensed signal detection/processing. In a typical arrangement, the interrogator is directly connected to the sensing optical fiber for signal generation and receiving. In addition, the interrogator is known to be specialized for its intended application—including specialized optics, specialized electronics/firmware, and specialized configuration/management/monitoring/application software. Such systems are known to work well for those single and/or specialized applications for which it is intended and pre-configured—including fully specialized applications, such as a distributed intrusion detection system.

With such utility and further technological advances, distributed fiber sensing has found additional application in more industries—some of which oftentimes requires a flexibility for different types of sensing. For example, submarine telecommunications applications require detecting activities proximate to undersea cable systems employing vibration and/or acoustic sensing. These emerging applications require more than the single-function, fully specialized systems provided in the art.

And while the specialization of distributed sensing systems described above remains a significant infirmity, so does the performance and sensing distance of such systems. As is known, prior art distributed sensing systems have only about a 50 km maximum reach while maintaining reasonable performance. Such systems nevertheless experience significant performance degradation/differentiation at greater distances. Accordingly, increasing the distance(s) over which distributed sensing systems operate reliably at an acceptable and consistent performance across all lengths would be a welcome addition to the art as well.

SUMMARY

The above problems are solved and advance in the art is made according to aspects of the present disclosure directed to an improved systems, methods, and structures for distributed fiber sensing systems including interrogator and attached fiber in which the interrogator includes a common line card and function-specific, pluggable front end in which the line card is configurable and supports different signal processing paths and automatically senses the front-end type and uses corresponding firmware/software or signal processing path(s) to process sensed data.

In sharp contrast to the prior art, systems, methods and structures according to aspects of the present disclosure will sense different types of environmental conditions along a fiber—and are not limited to a single, specific type as noted plagues the prior art.

BRIEF DESCRIPTION OF THE DRAWING

A more complete understanding of the present disclosure may be realized by reference to the accompanying drawing in which.

Figure 1:
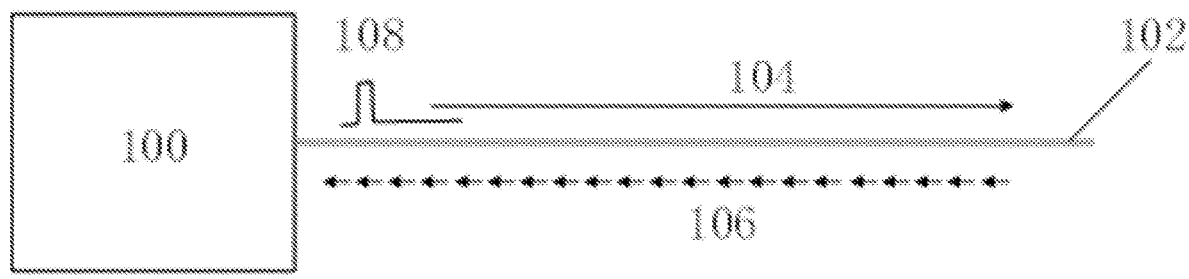
FIG. 1 is a schematic diagram illustrating a distributed vibrational sensing (DVS) system of the prior art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber sensing (DFS) is an important and widely used technology to detect environmental conditions (such as temperature, vibration, stretch level etc.) anywhere along an optical fiber that in turn is connected to an interrogator. As is known, contemporary interrogators are systems that generates an input signal to the fiber, detects and analyzes the reflected/scattered and subsequently received signal. The signals are analyzed and an output is generated which is indicative of the environmental conditions encountered along the length of the fiber. The signal(s) so received may result from reflections in the fiber, such as Raman backscattering, Rayleigh backscattering, and Brillion backscattering. It can also be signal of forward direction that uses the speed difference of multiple modes. Without losing generality, the following description assumes reflected signal though the same approaches can be applied to forwarded signal as well.

FIG. 1 is a schematic diagram illustrating a typical DFS system according to the prior art using reflected signals. With reference to that figure, interrogator 100 periodically generates optical pulses (108, or any coded signal) and injects them into fiber 102. The injected optical pulse signal is conveyed along fiber 102 as illustrated by 104.

At each location along the length of the fiber, a small portion of signal is reflected 106 and conveyed back to the interrogator. The reflected signal carries information the interrogator uses to detect, such as a power level change that indicates a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Figure 2:
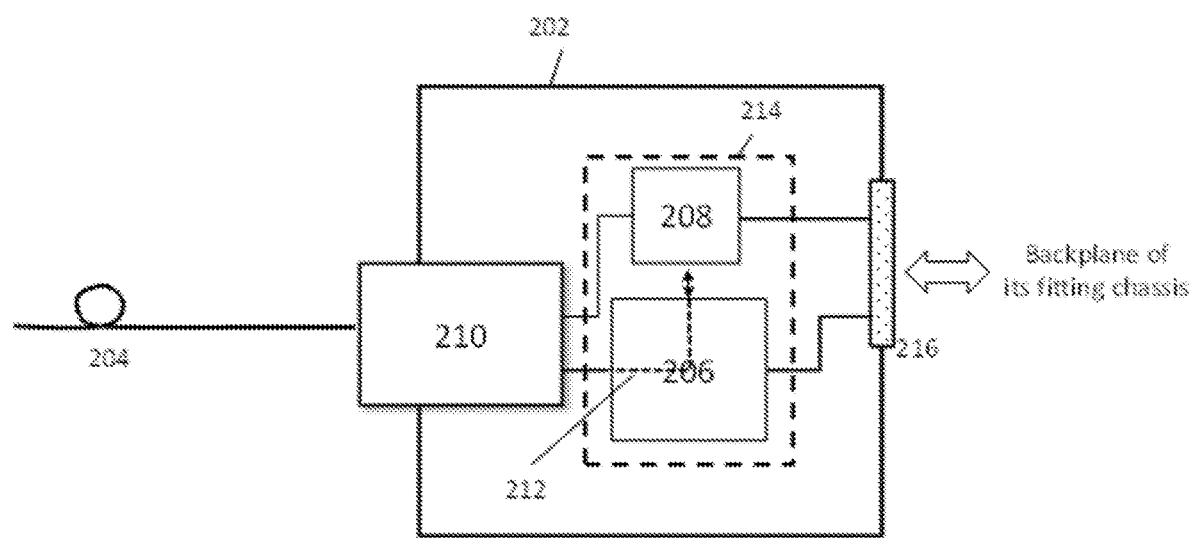
FIG. 2 is a schematic diagram illustrating a distributed fiber sensing (DFS) sensing system including a common interrogator line card according to aspects of the present disclosure.

With this background in place, we now note that systems, methods, and structures according to aspects of the present disclosure provide a DFS system that has common interrogator line card, and a pluggable, sensor-dependent front-end (or called sensing head). As shown schematically in FIG. 2, interrogator line card 202 having a standard mechanical dimension and backplane interface 216, advantageously matches and is electrically and mechanically compatible with that of an existing product line such as optical transponder or a switch. As shown therein, common modules such as DFS digital signal processing (DSP) processor 206 and a computer software processor (i.e., microprocessor/microcontroller) 208 are shown as being positioned on the line card. Note that while such integrated components 208 and 206 are shown as individual elements, they can also be integrated in an SoC (system-on-chip) 214.

As shown, module 210 is a pluggable sensing front-end that has a sensing fiber 204 attached. Module 210 supports different sensors and has a common mechanical dimension (such as CFP size) and an electrical interface that can be plugged into 202 and interface with 208 (for control, configuration, and monitoring) and 206 (for data path). The interface between 210 and 208 can also be through DSP 206, such as 212 shown in FIG. 2. Operationally, microprocessor and DSP may automatically sense the attached front-end module and configure its processing accordingly, either with different software/firmware set, or with different processing path.

Figure 3:
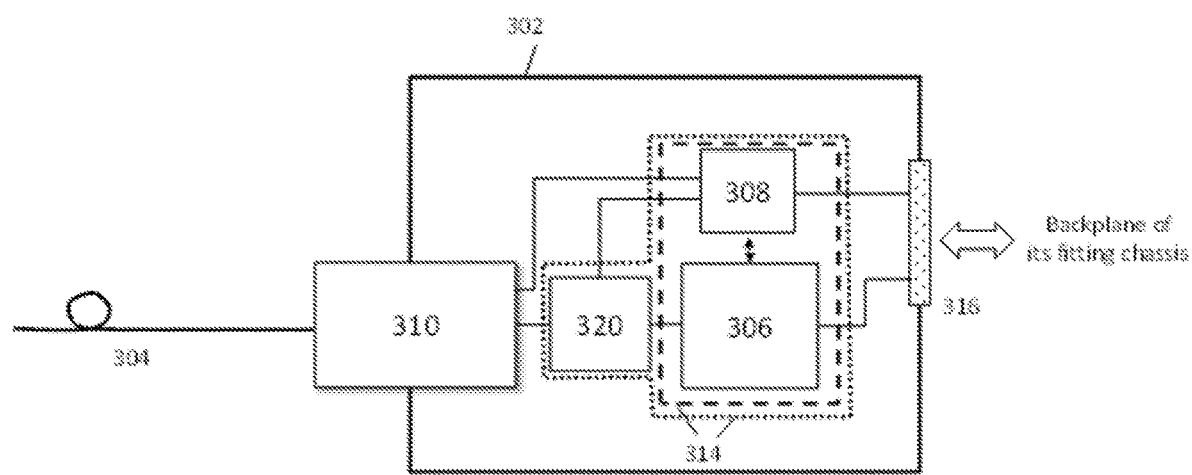
FIG. 3 is a schematic diagram illustrating another distributed fiber sensing (DFS) sensing system including a common interrogator line card according to aspects of the present disclosure.

In an alternative illustrative embodiment according to aspects of the present disclosure—besides DSP and microcontroller—other known devices located in front-end 310 can also be integrated into a line card, such as 320 in line card 302 of FIG. 3. Such common devices may include laser(s), signal generator(s) and modulator(s), analog-to-digital converter (ADC), etc.

Figure 4:
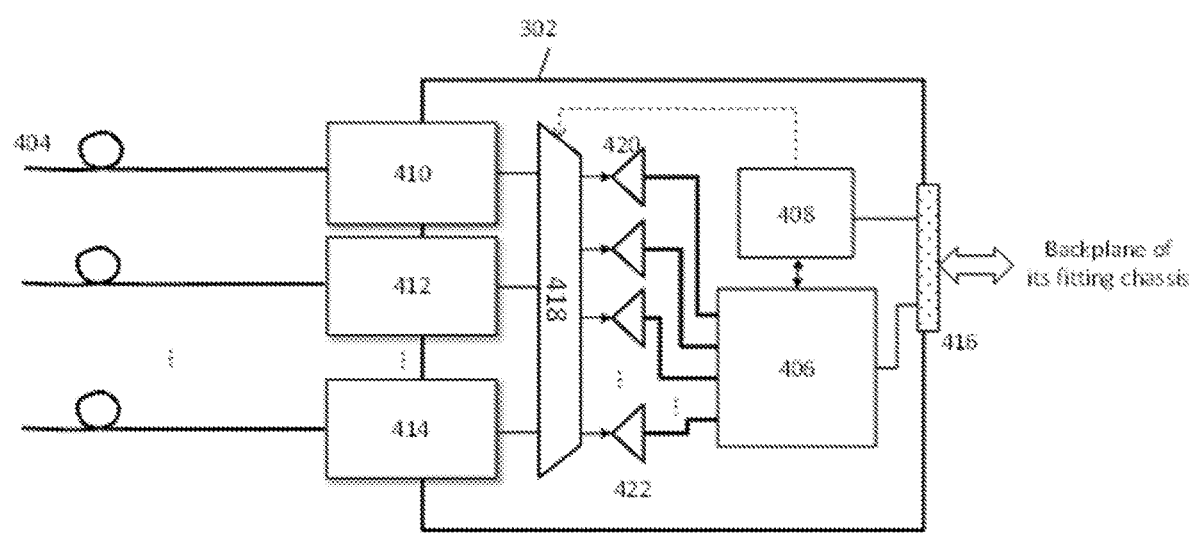
FIG. 4 is a schematic diagram illustrating yet another distributed fiber sensing (DFS) sensing system including a common interrogator line card having an analog switch according to aspects of the present disclosure.

In yet another alternative embodiment according to aspects of the present disclosure—the ADCs are located in the common line card, such as 420 in FIG. 4. In addition, the line card may include multiple front-end modules, such 410, 412, and 414, either of the same sensing function or a combination of different functions. On the line card, the ADCs (such as 420) can be dynamically allocated to connect to different front-end modules(s), through configuration circuit 418. For example, when a front-end has coherent receiver which takes polarization-X in-phase and quadrature, polarization-Y in-phase and quadrature, for 4 analog inputs in total, there will be 4 ADCs allocated for data acquisition and processing; when a front-end is direct-detection of single wavelength, there will be only one ADC used.

In one illustrative example configuration according to aspects of the present disclosure, the line card may include 8 ADCs, that can take 2× coherent front-end modules, or 1× coherent front-end plus 4 single-wavelength direct-detection, or other combinations. The ADCs can be allocated based on the plugged front-end modules.

Figure 5:
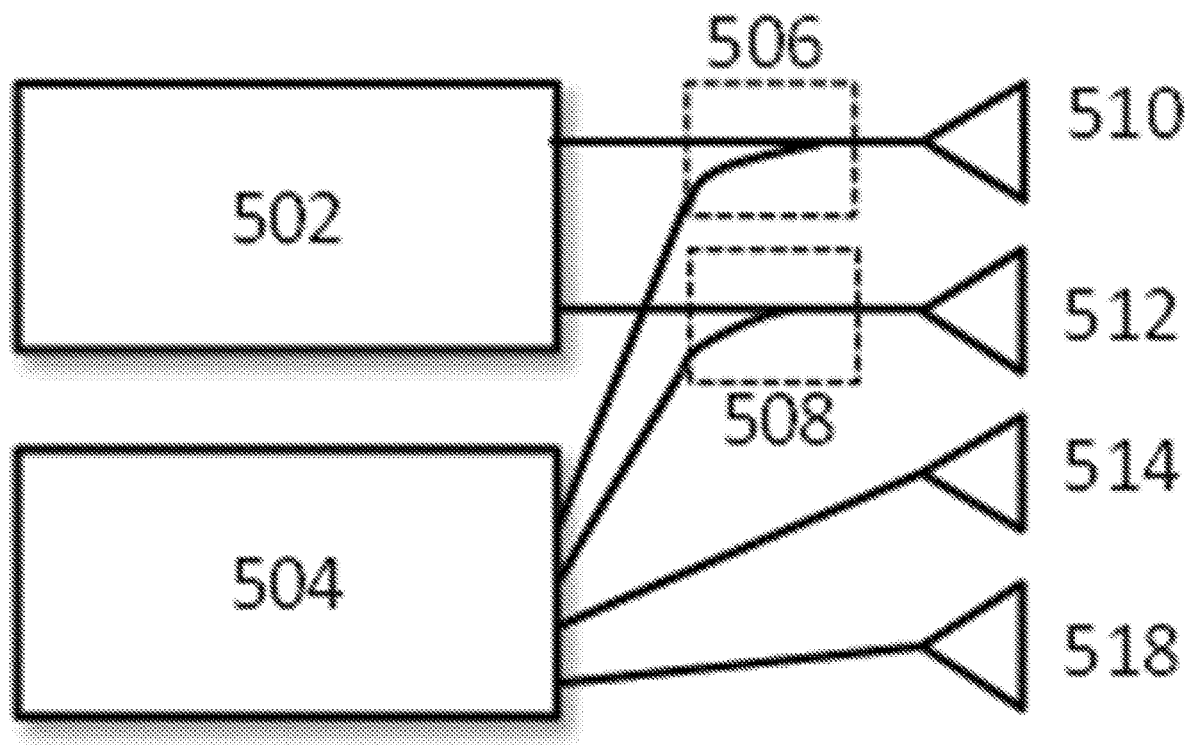
FIG. 5 is a schematic diagram illustrating a distributed fiber sensing (DFS) sensing system pluggable line card according to aspects of the present disclosure.

In yet another illustrative embodiment, 418 in FIG. 4 is an analog switch, which routes analog signals from a front-end connector to different ADCs. In still yet another illustrative embodiment, 418 is an electrical coupler, that one or more signal sources may be connected to one ADC, as illustrated in FIG. 5, where modules 502 and 504 are pluggable front-end, 510, 512, 514, and 518 are ADCs, and 506/508 are electrical couplers that implement the function of 418 in FIG. 4.

In an illustrative configuration according to aspects of the present disclosure, only coherent front-end 504 is plugged in, while 502 is empty, so the 4 signals output from 504 are detected by 510, 512, 514, and 518 respectively. In another illustrative configuration according to aspects of the present disclosure, both 504 and 502 have two analog channels, with 504 using the lower two branches, so ADCs 510 and 512 sample signals from 502 only.

Figure 6:
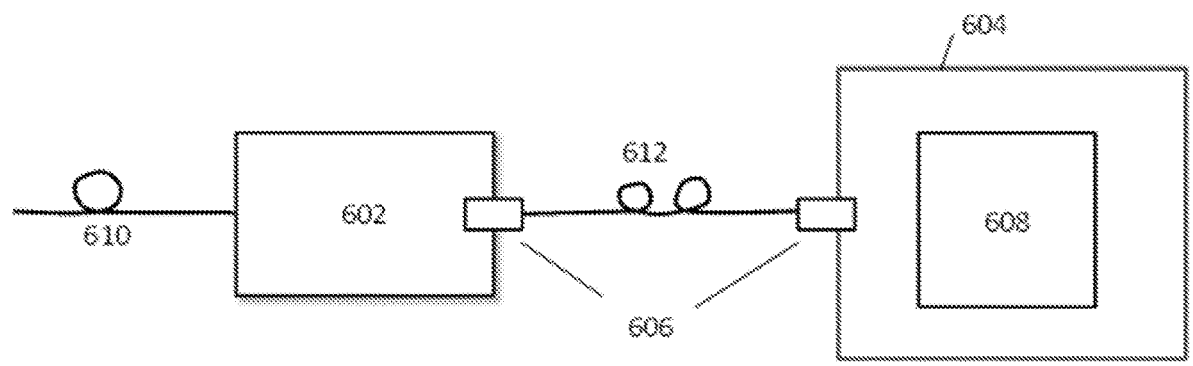
FIG. 6 is a schematic diagram illustrating a distributed fiber sensing (DFS) sensing system line card including a sensing head physically separated from the line card according to aspects of the present disclosure.

In yet another illustrative embodiment according to aspects of the present disclosure, the sensing head is physically separated from the line card, as shown schematically in FIG. 6. As illustrated in that figure, front-end sensing head 602 has integrated sensing optics and an ADC, so that any sensed signal is converted to the digital domain and transmitted through link 612. Advantageously, link 612 may be a serial link, connecting transceivers 606, which can be either electrical or optical.

Advantageously, an optical transceiver such as SFP+ may transmit signals up to 100 km, which greatly increases sensing reach from the line card. The serial link can be a directly encoded ADC signal, such as ADC serial interface standard JESD204B. The serial link can also be ADC signal encrypted in standard network frame, such as 10GE frame or SONET/SDH or fiber channel frame. We note that line card 604 is like 202 shown schematically in FIG. 2 except that the direct front-end socket is replaced by a digital transceiver module 606.

Figure 7:
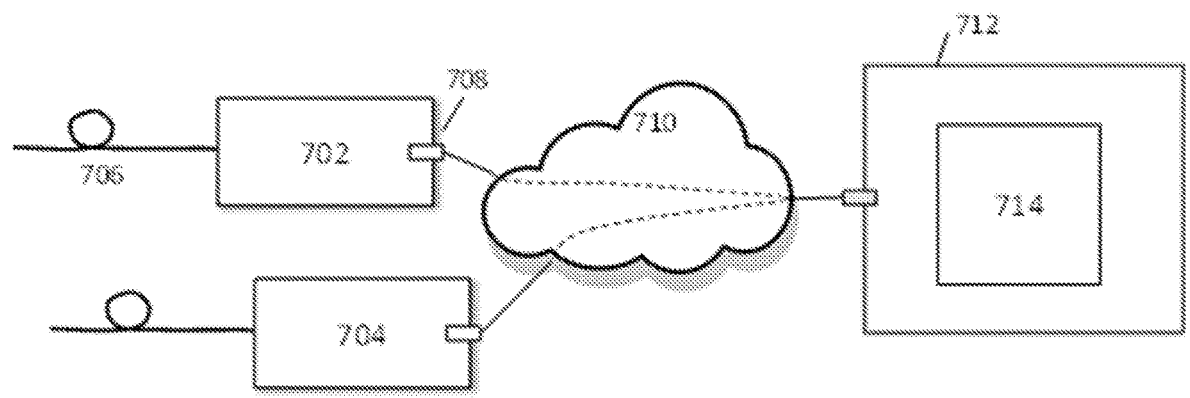
FIG. 7 is a schematic diagram illustrating a distributed fiber sensing (DFS) sensing system including a common interrogator line card integrated into a larger network according to aspects of the present disclosure.

In yet another illustrative embodiment according to aspects of the present disclosure, the serial signal may be transmitted through network 710 as in FIG. 7, which can be wavelength switched network, or TDM, or a packet switched network. Because of the switching feature from network 710, line card 712 can be located anywhere in the network and is capable to be virtually attached to any front-end, such as front-end 702 and 704.

Figure 8:
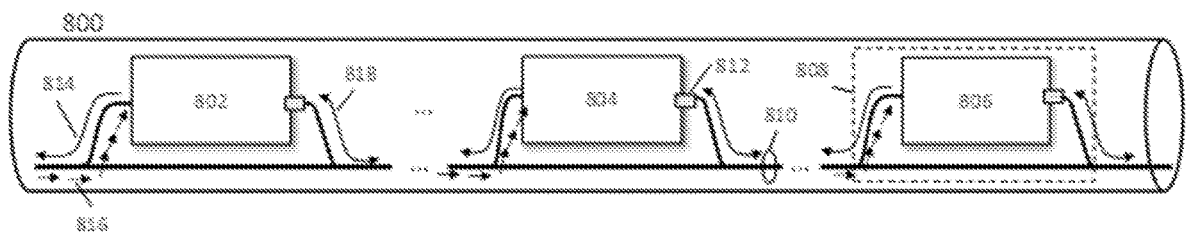
FIG. 8 is a schematic diagram illustrating a distributed fiber sensing (DFS) sensing system cascaded for extending sensing distance(s) according to aspects of the present disclosure.

With physically detached front-end module and the serialized digital connection with line card, multiple sensing head can be cascaded to form a longer sensing link, as shown illustratively in FIG. 8, wherein sensing heads such as 802, 804, and 806 are cascaded along the same cable 800. Each sensing head generates sensing signal such as signal 814, which is transmitted along its sensing segment. The reflected/sensed signal from each segment is connected back to its corresponding sensing head, such as signal 816 back to sensing head 802. The digitized signal (such as signal 818) from each sensing head (called up-link digital signal) is coupled into the cable 810 and further delivered to DSP section of the interrogator (such as sensing line card 604), using either wavelength multiplexing or other multiplexing methods. Advantageously, signal 818 can be bidirectional, with signal from line card to sensing head (called down-link digital signal) for control/configuration. The down-link digital signal can be broadcast as well, meaning that a single signal is transmitted from line card and received by all the sensing head, with each sensing head takes its portion only (such as assigned time slot, or the frame's ID tag).

Figure 9:
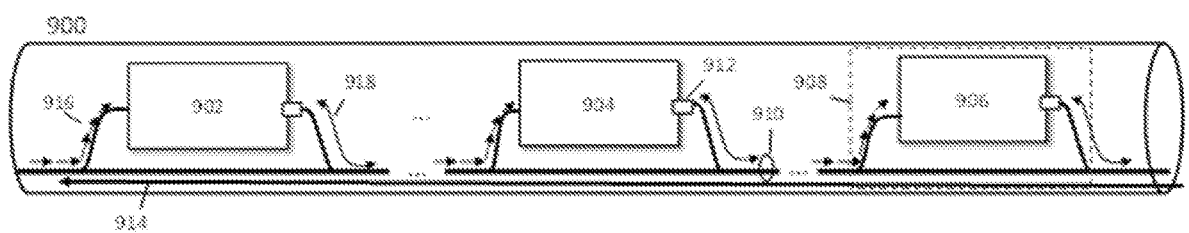
FIG. 9 is a schematic diagram illustrating another distributed fiber sensing (DFS) sensing system cascaded for extending sensing distance(s) according to aspects of the present disclosure.

Finally, we note that in still another illustrative embodiment according to aspects of the present disclosure, the optical sensing signal is generated at the line card, and transmitted down the sensing cable covering all the sensing segments, as shown illustratively in FIG. 9. Along the cable 900, there can be positioned amplifiers for this down-link sensing signal. For each sensing segment, the backscattering signal (such as signal 916) is received by the sensing-head for that segment only.

At this point, while we have presented this disclosure using some specific examples, those skilled in the art will recognize that our teachings are not so limited. Accordingly, this disclosure should be only limited by the scope of the claims attached hereto.

The invention claimed is:

1. An improved distributed fiber sensing system including an interrogator and attached fiber, said improved sensing system CHARACTERIZED BY:
    the interrogator includes a common line card configured to receive one or more function-specific, plug attachable/removable front-end, said front end configured to interrogate and sense one selected from the group consisting of: vibration, temperature, and acoustic characteristics of locations along the length of the fiber;
    the common line card provides different signal processing for each of the one or more function-specific, plug attachable/removable front end;
    the common line card automatically senses a type of function-specific plug attachable/removable front end and automatically invokes appropriate firmware/software and/or signal processing to appropriately process sensed data for that type of front end;
    the function-specific plug attachable/removable front end exhibits a standard mechanical size and interface(s);
    the common line card includes a digital signal processor and software signal processor automatically configured to support the function-specific plug attachable/removable front end;
    the common line card includes a common optical elements configured to support the plurality of function-specific plug attachable/removable front end of different types including vibration, acoustic, and temperature type(s); and
    the function-specific plug attachable/removable front end is remote from the line card and electrically/mechanically connected to the line card via cable and the front end is in electrical communication with the line card via digital serial link.

2. An improved distributed fiber sensing system including an interrogator and attached fiber, said improved sensing system CHARACTERIZED BY:
    the interrogator includes a common line card configured to receive one or more function-specific, plug attachable/removable front-end, said front end configured to interrogate and sense one selected from the group consisting of: vibration, temperature, and acoustic characteristics of locations along the length of the fiber;
    the common line card provides different signal processing for each of the one or more function-specific, plug attachable/removable front end;
    the common line card automatically senses a type of function-specific plug attachable/removable front end and automatically invokes appropriate firmware/software and/or signal processing to appropriately process sensed data for that type of front end;
    the function-specific plug attachable/removable front end exhibits a standard mechanical size and interface(s);
    the common line card includes a digital signal processor and software signal processor automatically configured to support the function-specific plug attachable/removable front end;
    the common line card includes a common optical elements configured to support the plurality of function-specific plug attachable/removable front end of different types including vibration, acoustic, and temperature type(s); and
    the function-specific plug attachable/removable front end is remote from the line card and optically/mechanically connected to the line card via optical cable SFP+.

3. An improved distributed fiber sensing system including an interrogator and attached fiber, said improved sensing system CHARACTERIZED BY:
    the interrogator includes a common line card configured to receive one or more function-specific, plug attachable/removable front-end, said front end configured to interrogate and sense one selected from the group consisting of: vibration, temperature, and acoustic characteristics of locations along the length of the fiber;
    the common line card provides different signal processing for each of the one or more function-specific, plug attachable/removable front end;
    the common line card automatically senses a type of function-specific plug attachable/removable front end and automatically invokes appropriate firmware/software and/or signal processing to appropriately process sensed data for that type of front end;

the function-specific plug attachable/removable front end exhibits a standard mechanical size and interface(s);

the common line card includes a digital signal processor and software signal processor automatically configured to support the function-specific plug attachable/removable front end;

the common line card includes a common optical elements configured to support the plurality of function-specific plug attachable/removable front end of different types including vibration, acoustic, and temperature type(s); and the function-specific plug attachable/removable front end is connected to the line card via serial link that is communicated via a network selected from the group consisting of packet switched network, wavelength switched network, and circuit switched network.

4. The improved sensing system according to claim 3 FURTHER CHARACTERIZED BY:

the function-specific plug attachable/removable front end is located at one end of the network and the line card is located at another end of the network and the line card is configurable to connect to any of a plurality of function-specific plug attachable/removable front end communicating via the network.

5. The improved sensing system according to claim 3 FURTHER CHARACTERIZED BY:

multiple function-specific plug attachable/removable front end are cascaded to form a longer link, each individual one of the multiple front end senses a different fiber segment.

* * * * *